Patented July 5, 1949

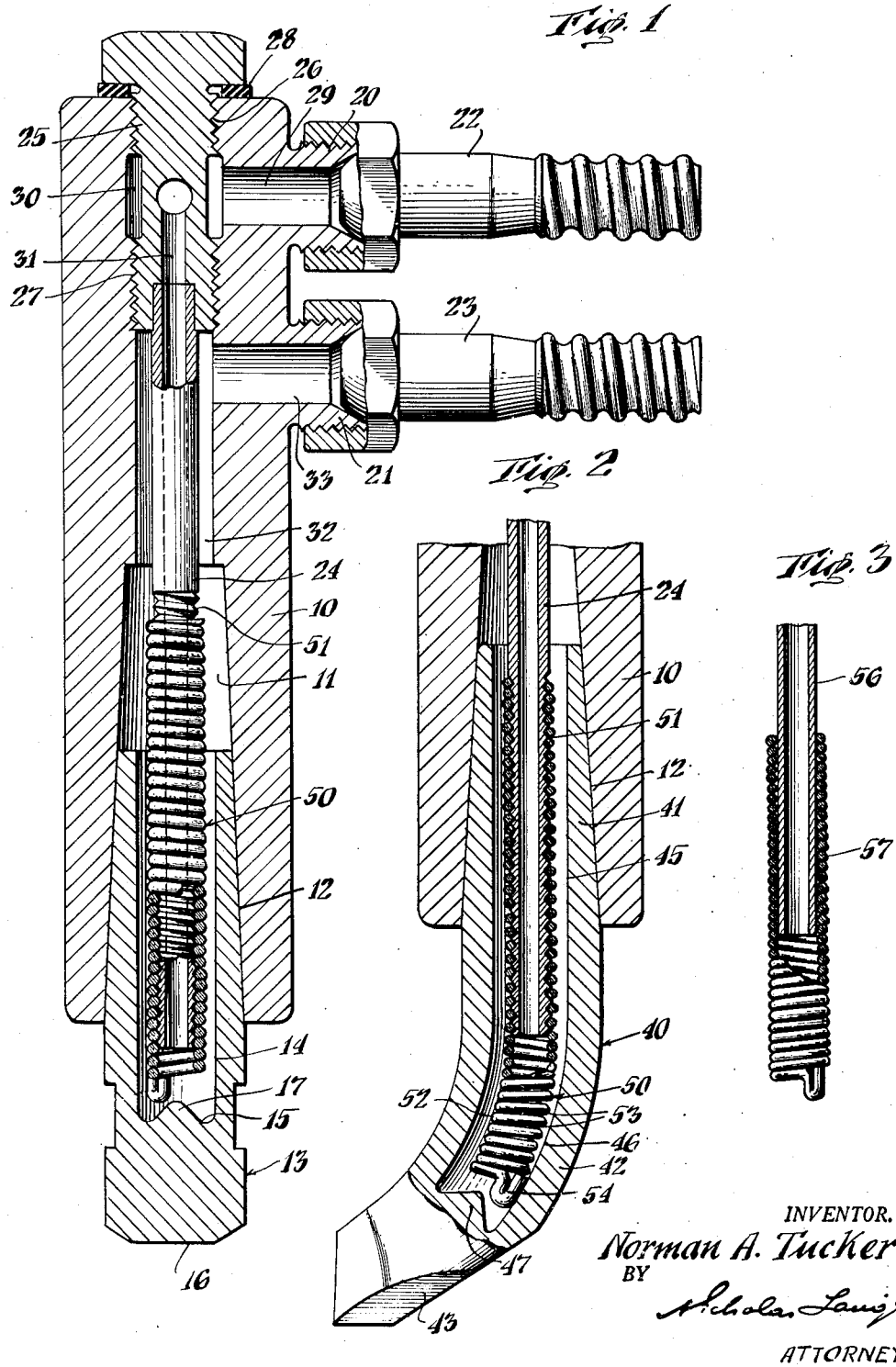

2,475,209

UNITED STATES PATENT OFFICE 2,475,209

RESISTANCE WELDING ELECTRODE AND HOLDER

Norman Albert Tucker, London, England, assignor to P. R. Mallory & Co., Inc.

Application June 3, 1947, Serial No. 752,053
In Great Britain July 24, 1945

Section 1, Public Law 690, August 8, 1946
Patent expires March 12, 1965

7 Claims. (Cl. 219—4)

This invention relates to resistance welding apparatus and, more particularly, to an improved electrode holder therefor.

Electrode holders used in resistance welding are usually provided with a replaceable tip which has an axial passage or water hole therein for permitting circulation of cooling fluid as closely as possible to the work engaging surface of the tip. A cooling fluid conduit is usually disposed in a chamber formed within the electrode holder and, when the holder and tip are assembled, this conduit extends into the axial passage in the tip, the end of the conduit being preferably spaced a very short distance from the inner end of the aforesaid axial passage.

As stated, the welding tip is removable for repair or replacement and, in order to provide maximum flexibility for the welding apparatus, it is desirable that the electrode holder be adapted for use with various styles and sizes of tips. Such variations in style and size may result in changes either in the length of the axial passage in the tip or in its shape. Thus, while the passage is straight in the ordinary welding tip, it may be arcuate in so called offset tips. Accordingly, where various types of tips are used with a single electrode holder, it has not been possible to insure that the end of the cooling fluid conduit be spaced the short, predetermined distance from the inner end of the passage necessary to provide efficient operation of the cooling system.

I overcome these disadvantages and shortcomings of the prior art by providing an adjustable member secured to the end of the cooling fluid conduit, the length of which may be increased or decreased to conform to the dimensions of the passage in the welding tip and the end of which is laterally deformable to accommodate itself to the passage in either a straight or offset welding tip.

According to a preferred embodiment of the invention, the adjustable member comprises a helical coil spring which is mounted on a threaded exterior portion provided at the end of the cooling fluid conduit, such spring acting as a flexible extension of the conduit which is laterally deformable in accordance with the contour of the passage in the welding tip. By rotating the spring upon the threaded portion, its length may be accurately adjusted so that the end of the spring is located a predetermined short distance from the inner end of the passage in the welding tip. In some cases, it is possible to eliminate the thread upon the exterior of the cooling fluid conduit, and rely only upon the frictional engagement of the spring and tube to hold the parts in proper position.

It is an object of the invention to improve the construction and operation of resistance welding apparatus.

It is a still further object to provide a welding electrode having a new and improved water cooling system which is adapted for use with welding tips of various sizes and shapes.

It is a still further object of the invention to provide an adjustable member at the end of the cooling fluid conduit in the welding electrode, the length of which may be increased or decreased and which is laterally deformable to accommodate itself to welding tips of various designs.

It is a still further object of the invention to provide a welding electrode which is simple in construction, reliable in operation, and which may be manufactured at low cost.

Other objects of the invention will be apparent from the following description and accompanying drawings taken in connection with the appended claims.

The invention accordingly comprises the features of construction, combination of elements, arrangement of parts, and methods of manufacture referred to above or which will be brought out and exemplified in the disclosure hereinafter set forth, including the illustrations in the drawings, the scope of the invention being indicated in the appended claims.

For a fuller understanding of the nature and objects of the invention as well as for specific fulfillment thereof, reference should be had to the following detailed description taken in connection with the accompanying drawings, in which:

Figure 1 is a sectional view, partially in elevation, of an electrode holder and welding tip constructed in accordance with the present invention.

Figure 2 is a sectional view, partially in elevation, of an electrode holder used with a modified form of welding tip; and Figure 3 is a sectional view, partially in elevation, of a modification of the invention.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring now to the drawings in detail, and particularly to Figure 1, the welding apparatus embodying the principles of the present invention may include an electrode holder or barrel 10 having an interior, longitudinally extending chamber 11 therein which has a tapered socket 12 at one end thereof for receiving a welding tip 13. An axial passage or water hole 14 is formed in the tip and the inner end 15 of this passage is spaced as closely as possible to the welding or work engaging surface 16 of the tip, it being understood that the head of the tip must be of sufficient thickness to withstand the heat and pressure developed during the welding operations. In order to streamline the flow of cooling fluid, a central conical projection 17 may be formed on the surface 15, as will be more fully explained hereinafter.

The water cooling system of the electrode holder may include an inlet 20 and an outlet 21 which are provided, respectively, with nipples 22, 23 for connection to a source of cooling fluid and a waste line for carrying away the fluid after it has been used. Communicating with the inlet 22 is a cooling fluid conduit 24 which is mounted, as by a force fit, in a nut member 25, the shank of which engages two threaded portions 26, 27 at the adjacent end of the chamber 11. The head of the nut member bears upon a resilient gasket 28 to prevent leakage of the cooling fluid from the interior of the chamber. It will be seen that the inlet 22 is connected to an interior opening 29 in the body of the welding electrode, this opening communicating with an annular passage 30 formed in the nut member 25 between the threaded portions 26 and 27. The annular passage 30 connects with an internal bore 31 in the nut member 25 which, in turn, communicates with the interior of the cooling fluid conduit 24. It will be apparent that cooling fluid may be introduced through inlet 22 whence it passes through the conduit 24 and is directed against the conical projection 17 of the welding tip. The fluid may then flow through the interspace 32 between the conduit 24 and the electrode holder 10 to a passage 33 communicating with the outlet 23.

With ordinary welding tips and particularly with welding tips utilizing a conical projection, as indicated at 17, the spacing between the inner end portion 15 and the discharge end of the cooling fluid conduit is of extreme importance. If the distance is too large, the circulation of cooling fluid at the inner end of the passage may be inhibited with the result that the temperature of the welding tip may reach excessive values. If this distance is too small, the velocity of the fluid flowing from the end of the cooling fluid conduit may be substantially reduced which, again, may cause the temperature of the welding tip to become excessive. Accordingly, it will be apparent that the distance of the cooling fluid conduit from the inner end of the passage 14 is an important factor in obtaining efficient operation of the welding apparatus. This is especially true of welding tips provided with a conical projection 17 where proper control of this distance causes a desirable streamline flow of the cooling fluid as it is discharged from the outlet of the conduit and flows back toward the outlet through the passage 32.

It is desirable that the electrode holder 10 be adapted for use with various types of welding tips to obtain flexibility of operation. Thus, welding tips may be either of the straight type, as shown in Figure 1, or the offset type illustrated by Figure 2, wherein the welding tip 40 has a straight portion 41 fitting into the socket 12 and an arcuate portion 42 terminating in a nose 43. In such tips, the inner passage may correspondingly have a straight portion 45 and an arcuate portion 46 terminating, at its inner end, at a conical projection 47 formed in the face of the tip.

The welding tips used with the electrode holder 10 may also vary in the length of the inner passage or water hole. Thus, the passage 14 in the straight welding tip 13 is substantially shorter than the corresponding passage in the offset tip 40.

In accordance with the invention, I provide an adjustable extension for the cooling fluid conduit which is adapted for longitudinal movement to compensate for variations in length of the inner passage of water hole and which is bendable or deformable to compensate for variations in the configuration of such inner passage. In this manner, I am able to obtain an accurate adjustment of the distance between the cooling fluid outlet and the inner end of the passage in the welding tip despite variations in size or shape of the tips used with a given electrode holder.

In the preferred embodiment of the invention illustrated by Figure 1 and 2, the adjustable extension comprises a helical spring 50 mounted on an external threaded portion 51 formed at the outlet of the conduit 24. The spring 50 may be moved longitudinally with respect to the conduit, thereby varying its effective length, by turning it in one direction or the other upon the threaded portion 51. This causes the spring to travel inwardly or outwardly along the conduit, depending on the direction of rotation, the fineness of adjustment being determined by the pitch of the screw thread.

It will be understood that, with this arrangement, the individual coils of the spring engage between the threads on the rigid part of the tube and the spring is thus firmly retained in position in any adjusted position thereof.

Further in accordance with the invention, the portion 52 of the spring which protrudes beyond the end of the conduit is flexible or deformable to enable it to conform to the contour of either a straight or offset type welding electrode. Thus, in the modification of Figure 2, it will be noted that the portion 52 of the spring is deformed into an arcuate shape conforming approximately to the curvature of the arcuate part 46 of the passage. Although the turns in the arcuately bent portion of the coil may be slightly spread apart, as at 53, substantially no liquid leaks through the spring at this point and, accordingly, the spring acts as a flexible extension of the tube. Preferably, the extreme end of the spring is shaped to form a hooked portion 54 which protrudes a short distance beyond the end of the coiled part of the spring. This provides a projection which may contact the inner end of the passage to prevent shutting off of the cooling fluid should the spring be unscrewed too far. It will be apparent that the spring 52 provides a very advantageous construction in that it can enter and will automatically follow bent or curved formations of the axial water holes of electrode tips of varying lengths and of straight or offset construction.

In some cases, it is not necessary to provide an exteriorly threaded portion upon the cooling fluid conduit. Referring to Figure 3, it will be seen that the conduit 56 has a smooth outer surface which is gripped between turns of a coil spring 57. In this modification of the invention, the internal bore of the coil spring is such that the coils thereof tightly grip the end of the conduit and are retained thereon without the necessity of utilizing external threads.

With this arrangement, it will be found that, although the coil spring may be applied to the rigid part by a direct non-rotative axial movement, this operation will be facilitated if, at the same time, the spring is rotated in a clockwise direction, that is to say, in the direction tending mutually to close the individual coils of the spring.

Adjustment of the position of the coil spring on the rigid part, and thus adjustment on the effective length of the inlet tube as a whole, is also readily effected by rotating the spring in the same direction, whether it is desired to increase or decrease the length of the tube, rotation in this direction tending to increase the internal diameter of the spring and thus lessen the frictional engagement thereof with the tube.

Rotation of the spring in the opposite i. e. in an anticlockwise direction, will merely mutually separate the coils not in engagement with the rigid tube end and tighten the grip of the engaging coils without producing any rotation of the said coils and any pull on the spring will not be transmitted to the said engaging coils until the spring has been stretched to an extent such that the tension applied thereto is sufficient to overcome the friction between the engaging coils and the rigid tube end.

Although I have described the invention in accordance with a few preferred embodiments thereof, it is to be understood that its applicability is not restricted to the specific forms shown in the drawings. Thus, where an electrode holder is designed for use only with straight welding tips of varying lengths, the spring 50 may be replaced by a rigid tube member threaded upon the end of the conduit 24. This arrangement will provide for longitudinal adjustment of the tube but not for the flexing or deformation thereof which is required when it is desired to use both straight and offset welding tips with the electrode holder. Further, a tube formed of hard resilient material may be utilized instead of the spring 50 in accordance with some modifications of the invention, this tube being deformable when inserted into a curved or offset welding tip. Various other changes, modifications and additions which may be made by those skilled in the art are within the scope of the appended claims.

What is claimed as new and desired to be secured by Letters Patent is:

1. Resistance welding apparatus comprising, in combination, an electrode holder having a longitudinal passage therein and a socket portion for receiving a welding tip, a cooling fluid conduit extending through said passage and having one end thereof positioned adjacent said socket, and a helical spring mounted on the end of said conduit and adapted for relative longitudinal movement with respect thereto, said spring constituting a laterally deformable extension of said conduit.

2. Resistance welding apparatus comprising, in combination, a hollow barrel having a socket therein for receiving a welding tip, a cooling fluid conduit mounted in said passage, a cooling fluid inlet connected to one end of said conduit, a cooling fluid outlet connected to the interspace between said conduit and said barrel, a welding tip mounted in said socket having a passage therein communicating with the interior of said barrel, the other end of said conduit extending into said passage, and a laterally deformable helical spring mounted on said other end of the conduit and being adjustable longitudinally with respect thereto so that the end of the spring may be disposed a predetermined distance from the inner end of said passage.

3. Resistance welding apparatus comprising, in combination, an electrode holder having a chamber therein and a socket at one end of said chamber, a welding tip mounted in said socket and having a passage therein communicating with said chamber, a cooling fluid conduit mounted in said chamber having an exterior threaded portion extending into said passage, and a helical spring mounted on said threaded portion, said spring constituting an extension of said conduit whereby rotation of said spring effects longitudinal motion of the same within said passage.

4. Resistance welding apparatus comprising, in combination, a welding electrode holder having a chamber therein and a tapered socket at one end of said chamber, a welding tip mounted in said socket having a passage therein communicating with said chamber, said passage having a straight portion and an arcuately curved portion, a cooling fluid conduit mounted in said chamber and extending into the straight portion of said passage, and a helical spring mounted upon the end of said conduit and extending into the curved portion of said passage.

5. Resistance welding apparatus comprising, in combination, a barrel member having a tapered socket at one end thereof which is adapted to receive a welding tip, a cooling fluid conduit mounted in the interior of said barrel and extending into proximity with said socket, and a compression spring mounted upon the smooth outer surface of said conduit and constituting a laterally deformable extension thereof, said spring being adapted for relative longitudinal movement with respect to said conduit.

6. Resistance welding apparatus comprising, in combination, an electrode holder having a chamber therein and a socket at one end of said chamber, a straight type welding tip mounted in said socket and having a cylindrical passage therein communicating with said chamber, a cooling fluid conduit mounted in said chamber having an exterior threaded portion extending into said passage, a helical spring mounted on said threaded portion, said spring constituting an extension of said conduit whereby rotation of said spring effects longitudinal motion of the same within said passage, and a U-shaped extension formed at the end of said spring.

7. Resistance welding apparatus comprising, in combination, a welding electrode holder having a chamber therein and a tapered socket at one end of said chamber, a welding tip mounted in said socket having a passage therein communicating with said chamber, a cooling fluid conduit mounted in said chamber and extending into said passage, a helical spring mounted on the end of said conduit and extending into the curved portion of said passage, and an extension formed on said spring to prevent the body of the spring from contacting the welding tip at the inner end of said passage.

NORMAN ALBERT TUCKER.

REFERENCES CITED

The following references are of record in the file of this patent:

UNITED STATES PATENTS

| Number | Name | Date |
| --- | --- | --- |
| 2,271,119 | Cox et al. | Jan. 27, 1942 |
| 2,374,979 | Carlson et al. | May 1, 1945 |
| 2,388,587 | Wilson | Nov. 6, 1945 |